United States Patent
Blechar et al.

(10) Patent No.: US 9,154,493 B2
(45) Date of Patent: *Oct. 6, 2015

(54) MANAGING MULTIPLE LOGINS FROM A SINGLE BROWSER

(71) Applicant: GOOGLE INC., Mountain View, CA (US)

(72) Inventors: Valerie Blechar, New York, NY (US); Micah Lemonik, New York, NY (US); Michael Wayne Crosby, San Mateo, CA (US); Robert Eugene Wyrick, Firestone, CO (US); Ronald Ho, Fremont, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,649

(22) Filed: Aug. 1, 2014

(65) Prior Publication Data

US 2014/0344911 A1    Nov. 20, 2014

Related U.S. Application Data

(63) Continuation of application No. 13/102,928, filed on May 6, 2011, now Pat. No. 8,825,747.

(60) Provisional application No. 61/332,648, filed on May 7, 2010.

(51) Int. Cl.
*H04L 29/06* (2006.01)
*G06F 21/41* (2013.01)
*G06F 17/30* (2006.01)

(52) U.S. Cl.
CPC ...... *H04L 63/0815* (2013.01); *G06F 17/30867* (2013.01); *G06F 17/30899* (2013.01); *G06F 21/41* (2013.01); *H04L 63/168* (2013.01)

(58) Field of Classification Search
CPC ... H04L 29/06; H04L 63/168; H04L 63/0815; H04L 9/3234; H04L 9/3228; H04L 63/0838; H04L 9/3213; G06F 21/41; G06F 17/30867; G06F 17/30899; G06F 17/3089; G06F 17/30566

See application file for complete search history.

(56) References Cited

U.S. PATENT DOCUMENTS

2004/0049673 A1* 3/2004 Song et al. .................. 713/150
2004/0117460 A1   6/2004 Walsh et al.
(Continued)

FOREIGN PATENT DOCUMENTS

GB          2 364 408 A      1/2002

OTHER PUBLICATIONS

IBM, "Representing Multiple Idenities in a Customizable Single Sign-on Token," IP.com Electronic Publication, Jun. 27, 2007, 3 pages.
International Search Report and Written Opinion, for copending PCT Application US2011/035703, Applicant Google Inc., filed May 9, 2011, Mailed Sep. 23, 2011, 15 pages.
(Continued)

*Primary Examiner* — Wing F Chan
*Assistant Examiner* — Benjamin M Thieu
(74) *Attorney, Agent, or Firm* — Birch, Stewart, Kolasch & Birch, LLP

(57) ABSTRACT

A method and a system for managing login using a cookie are described. The method includes receiving from a respective client system a request for document information, and receiving from the respective client system a cookie that identifies a plurality of user names logged into the server system from the respective client system. The plurality of logged-in user names includes a first user name and a second user name distinct from the first user name. The method also includes redirecting the received request to a location associated with a selected user name of the plurality of logged-in user names, and receiving the redirected request. The method furthermore includes, in response to the redirected request, processing the request as a request from the selected user name and sending to the respective client system document information corresponding to the request from the selected user name.

21 Claims, 15 Drawing Sheets

(56) References Cited

U.S. PATENT DOCUMENTS

| | | |
|---|---|---|
| 2005/0076230 A1 | 4/2005 | Redenbaugh et al. |
| 2007/0214272 A1 | 9/2007 | Isaacson |
| 2008/0134312 A1* | 6/2008 | Ache et al. ......... 726/9 |
| 2008/0189654 A1 | 8/2008 | Thomas |
| 2008/0209050 A1 | 8/2008 | Li |
| 2010/0241745 A1* | 9/2010 | Offen et al. ......... 709/224 |

OTHER PUBLICATIONS

Invitation to Pay Additional Fees and, Where Applicable, Protest Fees, from a Counterpart PCT Application No. PCT Application No. PCT/US/2011/035703, Date of Mailing Aug. 1, 2011, 4 pages.

Tredoux, G., "A Method for Allowing Multiple User Sessions from a Web Browser to a Web Server Application," Xerox Disclosure Journal, vol. 25, No. 1, Jan./Feb. 2000, 3 pages.

\* cited by examiner

MANAGING MULTIPLE LOGINS FROM A SINGLE BROWSER

RELATED APPLICATIONS

This application claims priority to U.S. Non Provisional patent application Ser. No. 13/102,928, filed May 6, 2011, which claims priority to U.S. Provisional Patent Application No. 61/332,648, filed May 7, 2010, which is hereby incorporated by reference in its entirety.

TECHNICAL FIELD

The disclosed embodiments relate generally to managing user logins to a server. More particularly, the disclosed embodiments relate to methods and systems for using a cookie having information for multiple user names to manage multiple user logins from a single browser (at a single client) to a server using the multiple user names.

BACKGROUND

Computer networks play a significant role in our lives, as more people gain access to the computer networks (e.g., the Internet) and people use the computer networks for more activities. Increasingly, more people use more than one account (e.g., email addresses) in accessing resources on the computer networks.

Login is a process to control access to computer systems, commonly used for authenticating authorized users in accessing computer systems over computer networks. A login process can be used to provide protection from access by unauthorized users. In addition, the login process can be used to identify respective users such that information relevant to the respective users can be provided.

Cookies in web browsers are widely used to manage or facilitate login sessions over the computer networks. However, traditional cookies are not designed to manage multiple logins (sometimes herein called concurrently active logins), under multiple user names, from a single browser to a single web site. Therefore, there is a need for a new method and system for managing multiple logins, under multiple user names, from a single browser to a single web site.

SUMMARY

A number of embodiments (e.g., of server systems, client systems or devices, and methods of operating such systems or devices) that overcome the limitations and disadvantages described above are presented in more detail below. These embodiments provide methods, systems, and graphical user interfaces (GUIs) for using a cookie to manage or facilitate multiple logins, under multiple user names, from a single browser and sending document information corresponding to a selected user name.

As described in more detail below, some embodiments of the invention involve a computer-implemented method that includes receiving from a respective client system a request for document information. The method also includes receiving from the respective client system a cookie that identifies a plurality of user names logged into the server system from the respective client system. The plurality of logged-in user names includes a first user name and a second user name distinct from the first user name. The method furthermore includes redirecting the received request to a location associated with a selected user name of the plurality of logged-in user names, and receiving the redirected request. The method also includes, in response to the redirected request, processing the request as a request from the selected user name and sending to the respective client system document information corresponding to the request from the selected user name.

A computer-implemented method that includes receiving from a respective client system a request for document information. The request including a user key. The method also includes receiving from the respective client system a cookie that identifies a plurality of user names logged into the server system from the respective client system. The plurality of logged-in user names including a first user name and a second user name. The method furthermore includes, when the user key matches the first user name, sending to the respective client system document information corresponding to the first user name. The method also includes, when the user key matches the second user name, sending to the respective client system document information corresponding to the second user name.

A computer implemented method includes providing to a respective client system a web page for accessing document information from the server system. The web page includes a user selectable object for selecting a user name from a plurality of user names logged into the server system from the respective client system. The method also includes receiving a request for document information corresponding to a selected user name of the plurality of user names. The method furthermore includes, in response to receiving the request, sending to the respective client system document information corresponding to the request.

A computer implemented method includes receiving from a respective client system a first cookie including at least a first user name logged into the server system from the respective client system. Login information for a second user name is received from the respective client system. The login information for the second user name is authenticated. When the login information for the second user name is authenticated, a second cookie is generated such that the second cookie includes at least the first user name and the second user name. The second cookie is sent to the respective client system. In a typical implementation, the second cookie replaces the first cookie in a cookie cache at the respective client system.

A system comprises one or more processors for executing programs and memory storing one or more programs be executed by the one or more processors, the one or more programs comprising instructions executed by the one or more processors so as to perform any of the embodiments of the aforementioned methods.

A computer readable storage medium stores one or more programs configured for execution by a computer, the one or more programs comprising instructions for performing any of the embodiments of the aforementioned methods.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

Like reference numerals refer to corresponding parts throughout the drawings.

Description Of Embodiments

Figure 1:
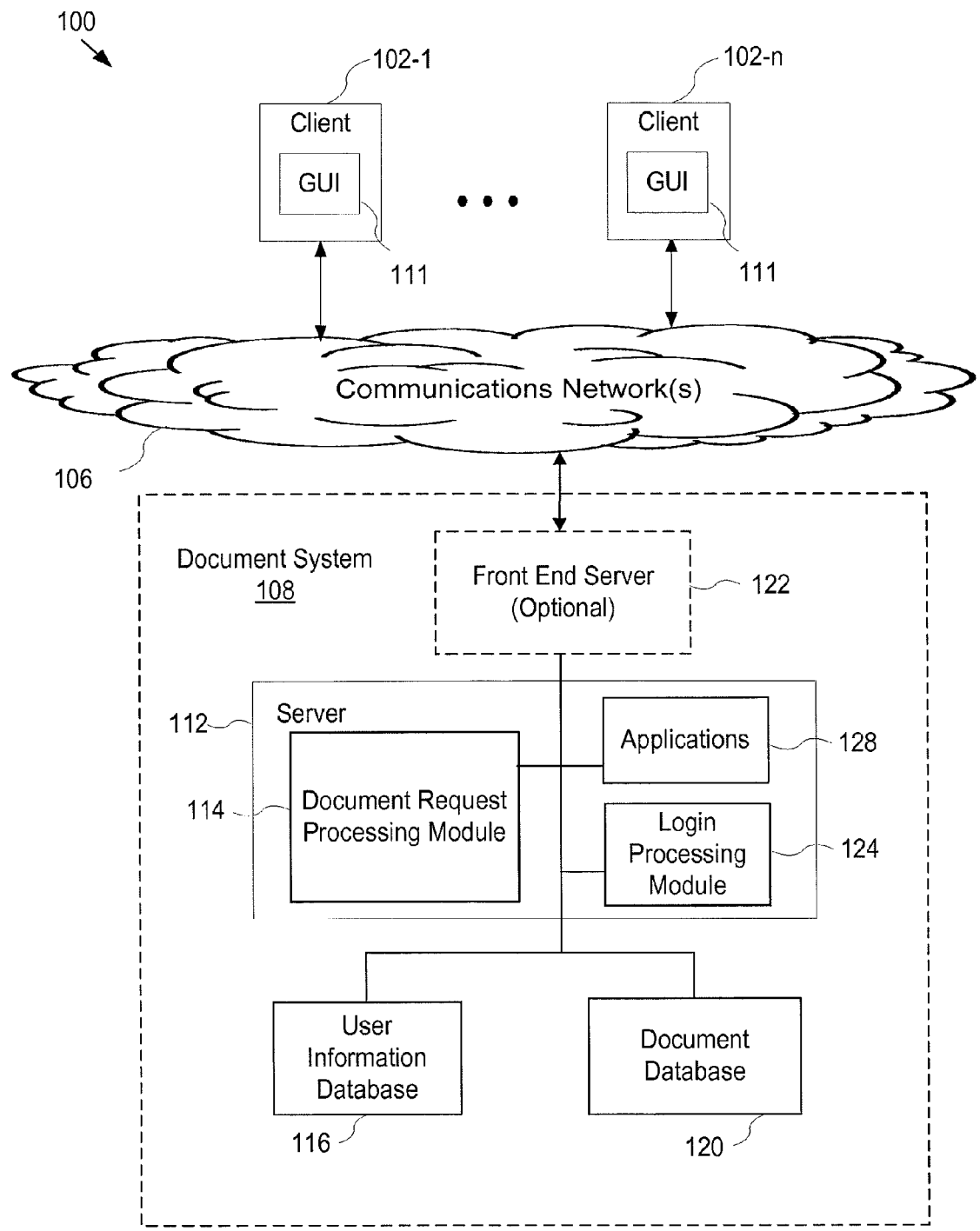
FIG. 1 is a block diagram illustrating an exemplary distributed computer system, in accordance with some embodiments.

Methods and systems for managing multiple logins using a cookie are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "URL" refers to a uniform resource locator, which is used interchangeably with a uniform resource identifier (URI).

FIG. 1 is a block diagram illustrating an exemplary distributed computer system 100, according to certain embodiments. In FIG. 1, system 100 includes one or more client computers 102, a communications network 106, and a document system 108. Various embodiments of the document system 108 implement the login methods described in this document.

Client computers 102 can be any of a number of computing devices (e.g., Internet kiosk, personal digital assistant, cell phone, gaming device, desktop computer, laptop computer, handheld computer, or combinations thereof) used to enable the activities described below. Client computer(s) 102 is also referred to herein as client(s). Client 102 typically includes a graphical user interface (GUI) 111. Client 102 is described in greater detail below with reference to FIG. 3. Client 102 is connected to the document system 108 via communications network 106. As described in more detail below, the GUI 111 is used to display document information and login pages. The document system 108 provides document services (e.g., document authoring, editing, sharing, mailing, and viewing services) to a community of users (e.g., the employees of a company, the members of an organization or group, friends, family members, etc.) who access the document system 108 from the clients 102.

Document system 108 includes one or more servers, such as server 112, connected to the communications network 106. Optionally, the one or more servers are connected to the communications network 106 via a front end server 122 (e.g., a server that conveys (and optionally parses) inbound requests to the appropriate server of the system 108, and that formats responses and/or other information being sent to clients in response to requests). The front end server 122, if present, may be a web server providing web based access to the document system 108. The front end server 122, if present, may also route communications to and from other destinations, such as a remote document server.

Document system 108 includes a user information database 116, and a document database 120. In some embodiments, the document system 108 also includes or has access to one or more other databases, such as a login database (not shown), which maintains login information. Server 112 includes a document request processing module 114, a login processing module 124, and applications 128. Server 112 communicates with databases internal to the document system 108, such as user information database 116, and document databases 120, and in some embodiments, a login database (not shown) using a local area network, by internal communication busses, or by any other appropriate mechanism or combination of mechanism.

Server 112 communicates with clients 102 via the front end server 122 (if present) and communication network(s) 106. In some embodiments, the communications network 106 is the Internet. In other embodiments, the communication network 106 can be any local area network (LAN), wide area network (WAN), metropolitan area network, or a combination of such networks. In some embodiments, server 112 is a web server that manages document requests using appropriate communication protocols. Alternatively, if server 112 is used within an intranet, it may be an intranet server.

Applications 128 include application programs used for managing an online document system. In some embodiments, applications 128 also include a user information processing module, where the user information processing module assists in accessing and updating user information database 116. User information database 116 stores various information associated with the users of the document system 108, including user preferences, display styles, and optionally other information such as login information. In some embodiments, a login database (not shown) stores the login information. Document database 120 store information concerning various types of documents as well as data (e.g., document contents).

Document request processing module 114 retrieves stored document information. Document request processing module 114 assists in accessing and updating document database 120, and in some embodiments, user information database 116. In some other embodiments, document request processing module 124 also assists in accessing and updating a login database (not shown).

In some embodiments, document database 120 stores information (e.g., metadata) concerning various documents in the document database. A non-exhaustive set of examples of such information includes document ID, author, access control list, timestamps (e.g., timestamps for one or more of creation date, revision history, last updated time, last accessed time, etc.), and document type (e.g., word processor document, spreadsheet, presentation file, etc.). In some embodiments, document database 120 also stores document data (e.g., contents) or information about a location of document data (e.g., a pointer to a remote server).

In some embodiments, the user information database 116 includes user information records having information relevant to the display of document information. For example, the user information record for a respective user may include, in addition to identifying information for the user, document folders, and default display settings (e.g., display a particular document, content of a particular folder, a list of documents associated with a particular document processing application (e.g., a word processor, spreadsheet, or presentation application), or a list of all documents).

In essence, server 112 is configured to manage certain aspects of document system 108, including managing login requests from a respective client 102.

Optionally, document system 108 is implemented as part of a document sharing system that provides document services (e.g., document authoring, editing, sharing, mailing, and viewing services) to a community of users (e.g., the employees of a company, the members of an organization or group, etc.).

In some embodiments, fewer and/or additional modules, functions or databases are included in document system 108 and server 112. The modules shown in document system 108 and server 112 represent functions performed in certain embodiments.

Figure 2:
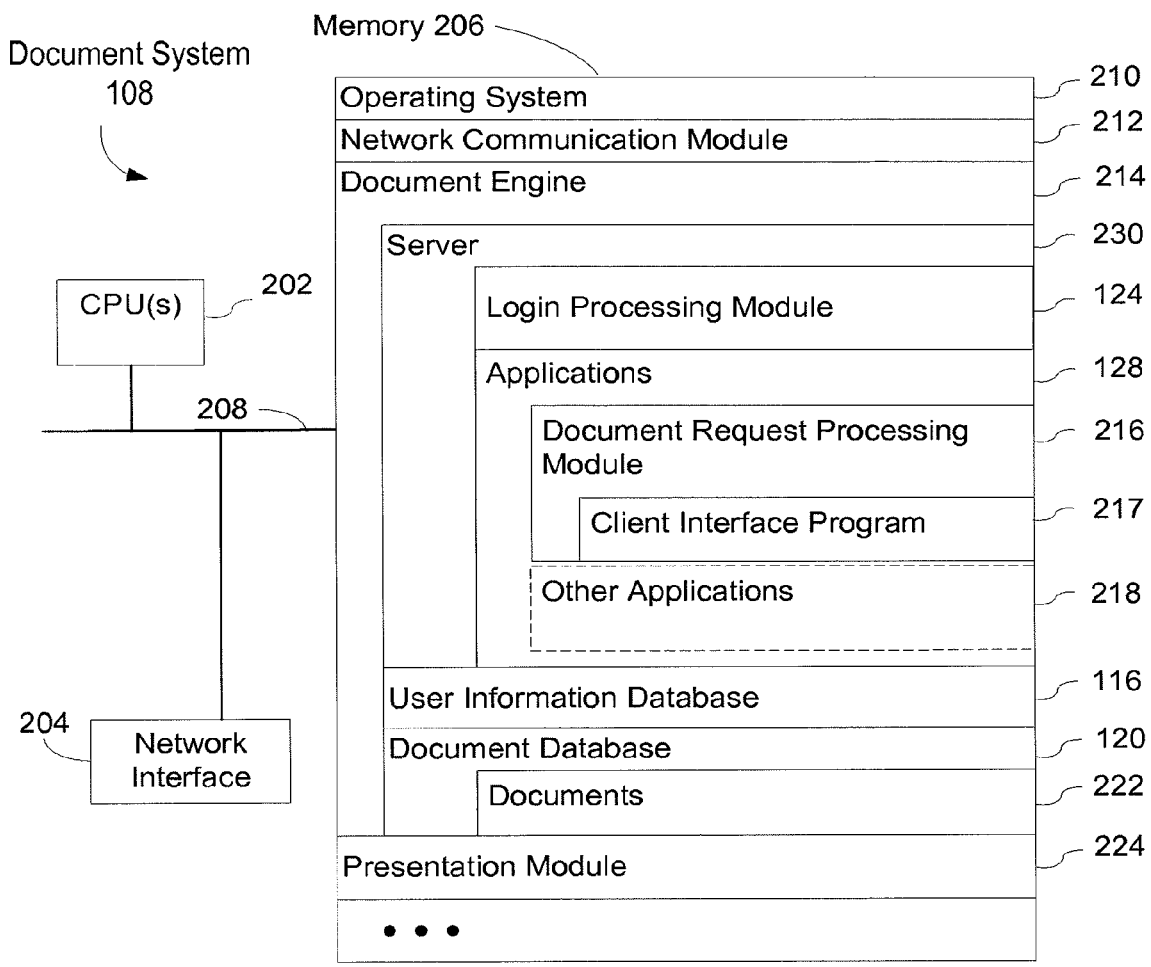
FIG. 2 is a block diagram illustrating a document system, in accordance with some embodiments.

FIG. 2 is a block diagram illustrating document system 108 in accordance with some embodiments. Document system 108 typically includes one or more processing units (CPUs) 202, one or more network or other communications interfaces 204, memory 206, and one or more communication buses 208 for interconnecting these components. In some embodiments, communication buses 208 include circuitry (sometimes called a chipset) that interconnects and controls communications between system components. In some other embodiments, document system 108 includes a user interface (not shown) (e.g., a user interface having a display device, a keyboard, and a mouse or other pointing device), but more typically document system 108 is controlled from and accessed by various client systems.

Memory 206 of the document system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a computer readable storage medium. The computer readable storage medium of memory 206 is a non-transitory computer readable medium for storing information. In some embodiments, memory 206 or the computer readable storage medium of memory 206 stores the following programs, modules and data structures, or a subset thereof:

- Operating System 210 that includes procedures for handling various basic system services and for performing hardware dependent tasks;
- Network Communication Module (or instructions) 212 that is used for connecting the document system 108 to other computers (e.g., clients 102) via the one or more communications interfaces 204 and one or more communications networks 106 (FIG. 1), such as the Internet, other wide area networks, local area networks, metropolitan area networks, and so on;
- Document Engine 214 that receives document information requests from and provides responses to clients 102; and
- Presentation module 224 that formats results from document engine 214 for display at respective clients; for example, presentation module 224 may generate a web page or XML document that includes document information; in some embodiments presentation module 224 is executed by front end server 122, which comprises one of the servers implementing the document system 108; optionally presentation module 224 is a module of document engine 214.

In some embodiments, document engine 214 includes the following programs, modules and data structures, or a subset or superset thereof:

- one or more server modules 230, corresponding to server 112 in FIG. 1, for managing certain aspects of the document system 108 including a login processing module 124, and applications 128, including a document request processing module 216 for performing the primary functions of an online document system; the document request processing module 216 includes a client interface program (or module) 217 for receiving document information requests from and generating responses to the requests; the application 128 may optionally include other applications 218;
- User information database 116 that stores records for users; and
- Document database 120 that stores documents 222 (e.g., document contents), and possibly other document data as well (e.g., author, access control list, time stamps, document size, document type, etc.).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, the user information database 116 is part of or stored within server 112. In other embodiments, the user information database 116 is implemented using one or more servers whose primary function is to store and process user information. In some embodiments, the document database 120 includes user database 116, or vice versa. In some embodiments, the document database 120 can be implemented on one or more remote servers.

The actual number of servers used to implement the document system 108 and how features are allocated among them will vary from one implementation to another, and may depend in part on the amount of data traffic that the system must handle during peak usage periods as well as during average usage periods, and may also depend on the amount of data stored by the document system 108. Moreover, one or more of the blocks (e.g., server 112, document database 120) in FIG. 1 may be implemented on one or more servers designed to provide the described functionality. Although the description herein refers to certain features implemented in client 102 and certain features implemented in server 112, the embodiments are not limited to such distinctions. For example, features described herein as being part of server 112 can be implemented in whole or in part in client 102, and vice versa.

Figure 3:
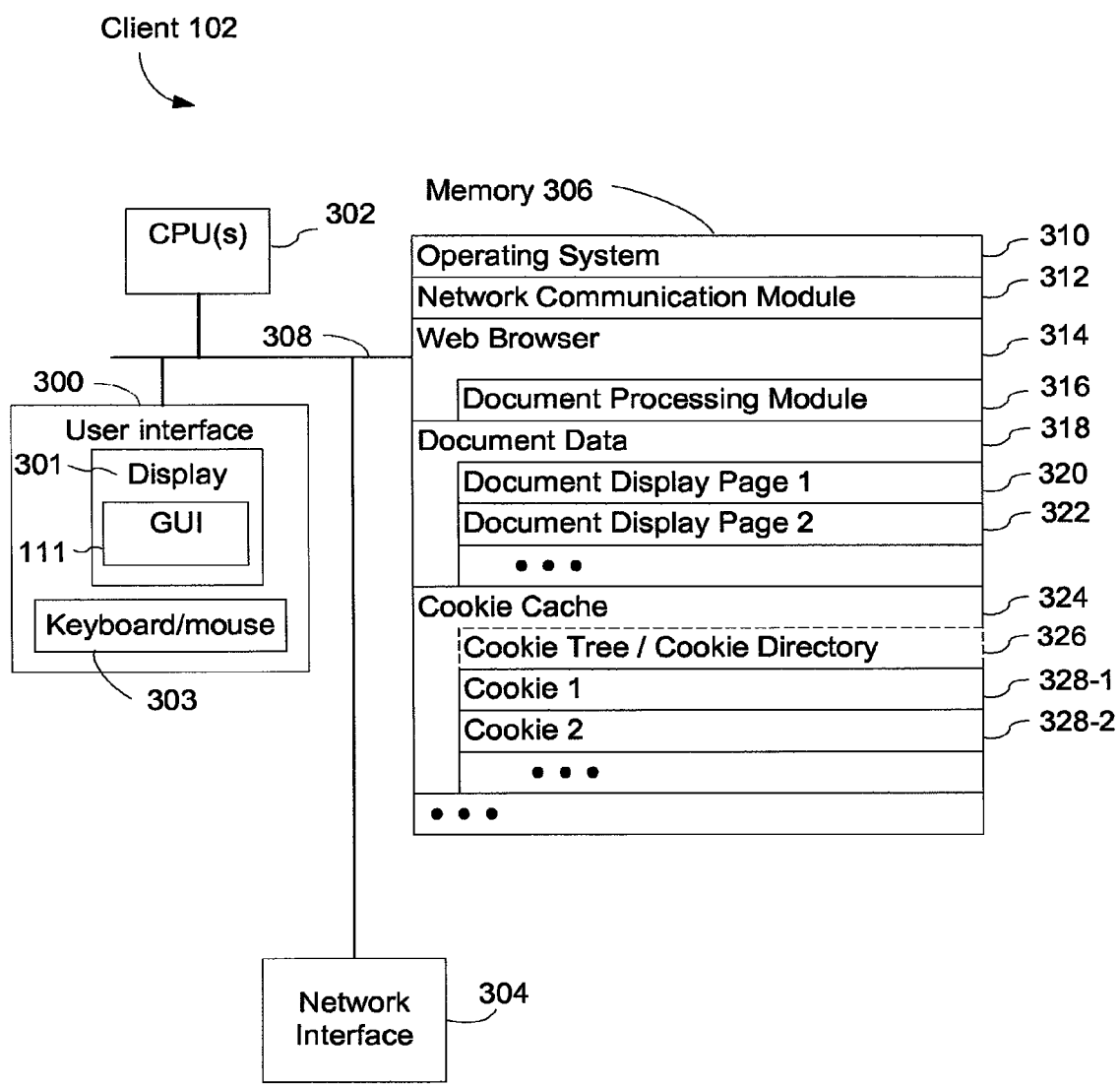
FIG. 3 is a block diagram illustrating a client, in accordance with some embodiments.

FIG. 3 is a block diagram illustrating a client, also called client systems or client devices, in accordance with some embodiments. The clients 102 as shown in these figures are configured for use by a subscriber (also herein called "the user") of the document system 108. The client includes a user interface 300, which typically includes a display device 301, and one or more input devices 303 such as a keyboard and a mouse or other pointing device. As noted above, client 102 includes a graphical user interface (GUI) 111, which is displayed on the display device 301. Client 102 typically includes one or more processing units (CPUs) 302, one or more network or other network communications interfaces 304, memory 306, and one or more communication buses 308 for interconnecting these components. The communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a computer readable storage medium. The computer readable storage medium of memory 306 is a non-transitory computer readable medium for storing information. In some embodiments, memory 306 or the computer readable storage medium of memory 306 stores the following programs, modules and data structures, or a subset thereof:

- Operating System 310 that includes procedures for handling various basic system services and for performing hardware dependent tasks;
- Network Communication Module (or instructions) 312 that is used for connecting client 102 to other computers (e.g., the document system 108 and other clients 102) via the one or more communications Network Interfaces 304 (wired or wireless) and one or more communication networks 106 (FIG. 1), such as the Internet, other wide area networks, local area networks, metropolitan area networks, and so on;
- Web Browser Application 314; optionally, web browser application 314 or an extension, plug-in or toolbar of the browser application includes a document processing module 316 that handles data formatting and/or management tasks, at least some of which would otherwise be handled by presentation module 220 (FIG. 2);
- Document Data 318, which includes document display pages (e.g., document display page 1 (320) and document display page 2 (322), etc.); a respective document display page is typically a webpage (or XML document or the like) received from the document system 108; the respective document display page includes document information for display in the GUI 111; in some embodiments, the respective document display page includes embedded instructions for receiving document-related input from a computer user (e.g., a request to edit a displayed document or to display a different document) and for formatting document data for display in GUI 111; alternatively, or in addition, instructions for receiving document related input from the computer user and/or for formatting document data for display may be implemented in a document processing module 316, as mentioned above; and
- Cookie Cache 324, which includes a cookie tree 326 (also called a cookie directory) and at least one cookie 328; the cookie tree 326 includes information indicating in which path and/or domain a corresponding cookie is configured to be used; the at least one cookie 328 includes respective cookies used in one or more document display pages (e.g., 320 and 322); optionally, cookie tree 326 is implemented as a trie data structure.

Optionally, memory 306 includes additional other applications or components.

Figure 4:
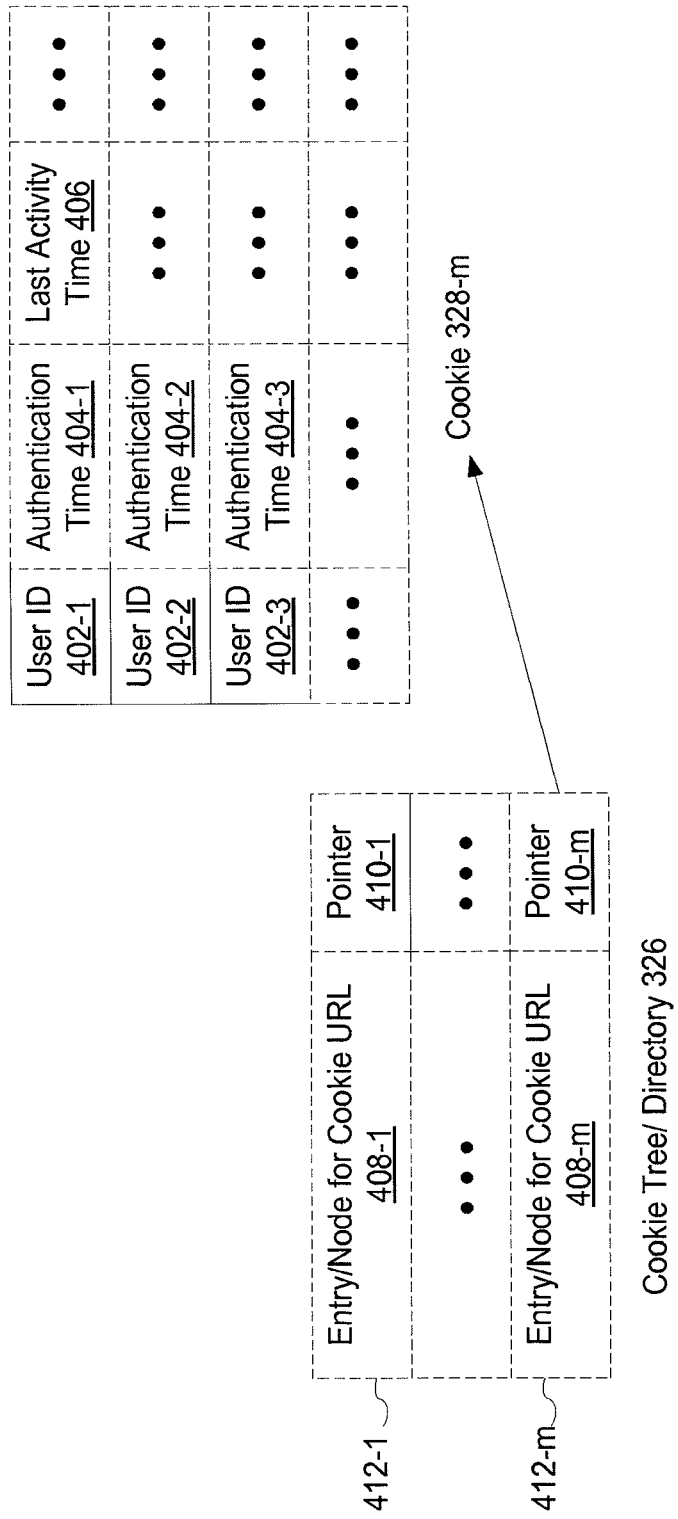
FIG. 4 is a block diagram illustrating an exemplary cookie tree/directory and an exemplary cookie, in accordance with some embodiments.

FIG. 4 is a block diagram illustrating an exemplary cookie tree 326 (also called cookie directory) and an exemplary cookie 328 in accordance with some embodiments. Cookie tree 326 is typically stored in the cookie cache 324 of a client 102, as shown in Figure Cookie tree 326 stores cookie tree entries, for example entry 1 (412-1) through entry m (412-$m$), where m represents the number of entries (or the number of entries for a respective web browser application, or the number of entries for a respective client user account). A respective cookie tree entry (e.g., entry 412-$m$) includes a field for storing cookie URL information 408-$m$, which may comprise a portion of a cookie URL path or a complete URL path. Cookie tree entries 412 are also herein called nodes of the cookie tree. If the cookie tree 326 is implemented as a trie or other tree data structure, the cookie URL information in any one entry typically includes only the portion of the cookie URL path not specified by the parent nodes (entries) in the cookie tree 326. The cookie URL information 408, either alone or in conjunction with the cookie URL information of its parent nodes, identifies the path of a web site at which the corresponding cookie is to be used.

When a respective cookie tree entry 412-$m$ "includes a cookie," the entry also includes a pointer to a corresponding cookie (e.g., cookie 328-*m*). In some implementations (e.g., in implementations that store the cookie tree in a trie), some cookie tree entries 412 are "just" parent nodes that store cookie URL information, but which do not have their own cookies. Thus, if the cookie tree 326 includes entries for multiple cookies that all have the same parent URL, such as www.a.b, but no cookie for this parent URL has been stored in the cookie cache 324, the cookie tree 326 may include a node (i.e., entry 412) for the parent URL that does not have a pointer 410 to a cookie 328. In other implementations, all cookie tree entries 412 correspond to cookies 328 in the cookie cache 324.

In some implementations, a respective cookie (e.g., cookie 328-*m*) includes the following data, or a subset or superset thereof, for each user name or user account that is logged into the document system from a single browser of client 102:

User ID 402 that uniquely identifies one user name or user account logged-in to the document system 108 from the client 102;

(optional) Authentication Time 404 that identifies the time when a respective user ID 402 (in the cookie 328-*m*) was authenticated;

(optional) Last Activity Time 406 that identifies the last time when a respective user ID 402 (in the cookie 328-*m*) was used to send or receive information to and from the document system 108; in some embodiments, the cookie 328-*m* includes a respective last activity time 406 for each user ID 402 in the cookie 328, and the respective last activity time 406 identifies the last time when the corresponding ID 402 was used to send or receive information to and from the document system 108.

In some embodiments, a cookie (e.g., cookie 328-*m*) also includes the following data, or a subset or superset thereof, for each user name or user account that is logged into the document system from a single browser of client 102:

a domain name that identifies the domain associated with a respective user ID 402 (in the cookie 328-*m*);

an expiration date that identifies the expiration date of the authentication for a respective user ID 402; and website specific information, as represented as one or more pairs of a variable name (also called a variable attribute), and a variable value, or a series of values; such website specific information, if present, can be used by the document system 108 in conjunction with the corresponding user ID 402.

In some embodiments, the cookie tree 326 includes cookie (s) 328. In some embodiments, the cookie 328 includes entry/node information 408. In such embodiments, a cookie tree 326 separate from the cookies 328 is not maintained.

FIGS. 5A-5D illustrate exemplary user interfaces associated with multiple login, in accordance with some embodiments.

Figure 5A:
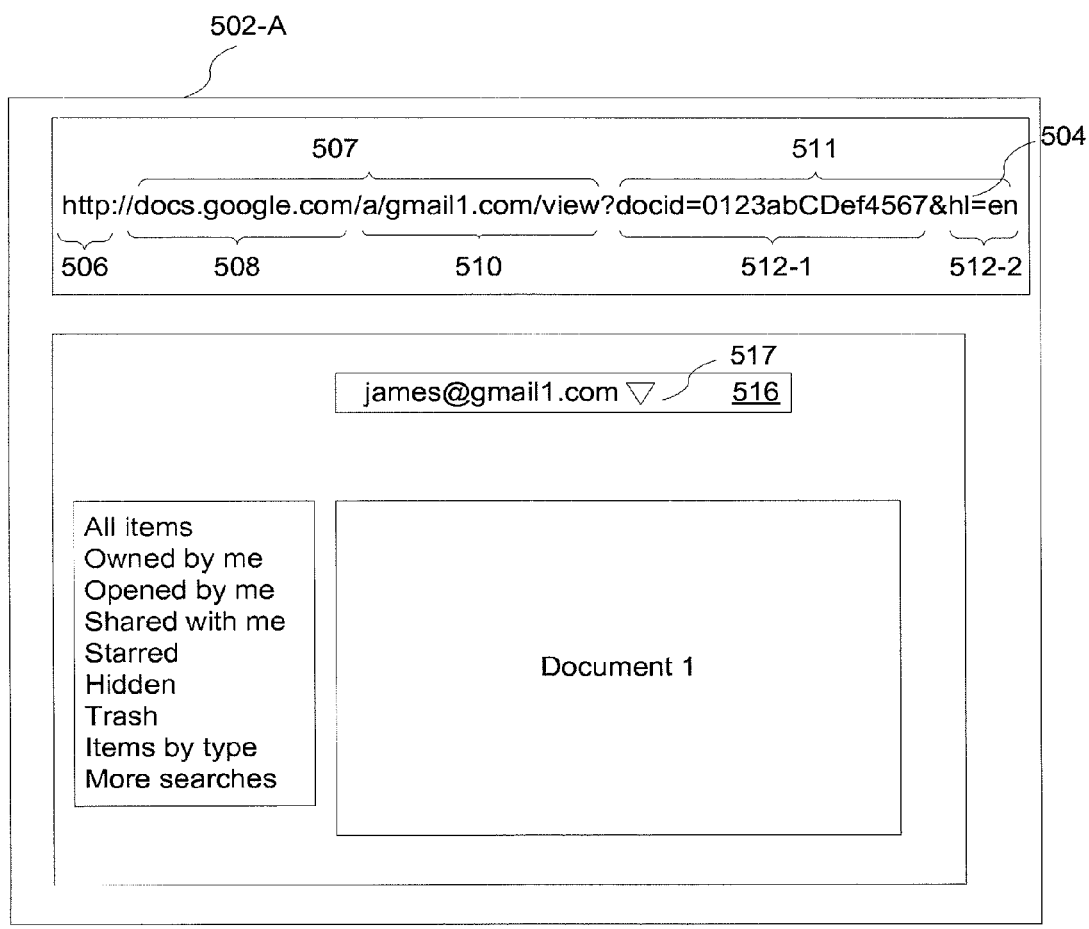
FIGS. 5A-5D illustrate exemplary user interfaces associated with multiple login, in accordance with some embodiments.

FIG. 5A illustrates an exemplary user interface 502-A displayed in a GUI 111 of a client 102. The user interface 502-A in FIG. 5A includes a URL 504 (sometimes herein called the request URL), user information 516, and document information (e.g., "document 1"). The URL 504 includes the following, or a subset or superset thereof:

scheme 506, which identifies a type of a corresponding resource (e.g., "http" which indicates that the resource is a hypertext transfer protocol resource; "file" which indicates that the resource is a file on local or network file systems, etc.), or a protocol to access a corresponding resource (e.g., "http" which also indicates that an http protocol is needed to access the corresponding resource; "ftp" which indicates that an ftp protocol is needed to access the corresponding resource (in a web-browser or a separate ftp application); "mailto" which indicates that an email application is needed to mail to the corresponding resource (e.g., an email address), etc.);

a location identifier 507, which includes a domain name (also called hostname) 508; the domain name identifies a name of one or more servers that provide document services;

path 510, which identifies a location of the resource within the domain identified by the domain name 508; in some embodiments, location identifier 507 includes a domain name 508 but does not include a path 510 path, in which case a server receiving the URL 504 identifies a resource from a default path (e.g., home directory); and (optional) query string 511, which identifies parameters to be provided to a server (e.g., document system 108); typically, a query string includes name-value pairs (e.g., a name for a first variable and a value for the first variable, a name for a second variable and a value for the second variable, etc.); for example, the query string 511 includes a first name-value pair 512-1 and a second name-value pair 512-2; the first name-value pair 512-1 includes a variable "docid" with a corresponding value "0123abCDef4567," and the second name-value pair 512-2 includes a variable "hl" with a corresponding value "en." The query string can include any number of name-value pairs. Some URLs do not include a query string, but many URLs do. In most implementations, the URL for accessing a specific document from an online document service will contain at least one name-value pair 512 in a query string 511 to identify the document to be accessed. However, in other implementations the URL for accessing a specific document uses a path 510 or a combination of a path 510 and one or more name-value pairs 512 in a query string 511 to identify the document to be accessed.

In FIG. 5A, user information 516 includes a user name (e.g., "james@gmaill.com"). The user name can be an email address or any other suitable user ID or ID name (e.g., a nickname or a screen name).

When query string 511 includes a docid variable and a corresponding value (e.g., 512-1), the docid value is used to retrieve a corresponding document. In response to receiving a request with a document ID, upon determining that the request is from a user authorized to access the document or otherwise determining that the request is to be honored, the server sends a web page including the corresponding document to a client 102, and the client 102 displays the web page including the corresponding document in a GUI 111 of the client 102.

In some embodiments, a portion of the path or the query string includes information (e.g., a "user key") corresponding to the user name. For example, the path 510 includes a string "gmaill.com/view," which corresponds to the domain name "gmaill.com" of the user name "james@gmaill.com." Alternatively, the path may include the full user name "james@gmaill.com." In yet other implementations, the query string 511 may include the full user name "james@gmaill.com" or the domain name "gmaill.com" corresponding to the user name. In this example, the "/view" portion of the path 510 indicates the type of document access requested by the client. Additional examples of access type strings that could be included in the path 510 are "/edit" or a null string (for enabling read-write access to a document), "/preview" (for previewing a document), and "/create" (for creating a new document).

In some embodiments, the path or the query string is encrypted (i.e., includes encrypted information) for security purposes (e.g., increase difficulty in manipulating the path and/or the query string for unauthorized activities). In some embodiments, the path and/or the query string includes a hash key, which is used by the server to look up or otherwise identify corresponding path or query string information.

In some embodiments, user information 516 includes a user selection icon 517.

Figure 5B:
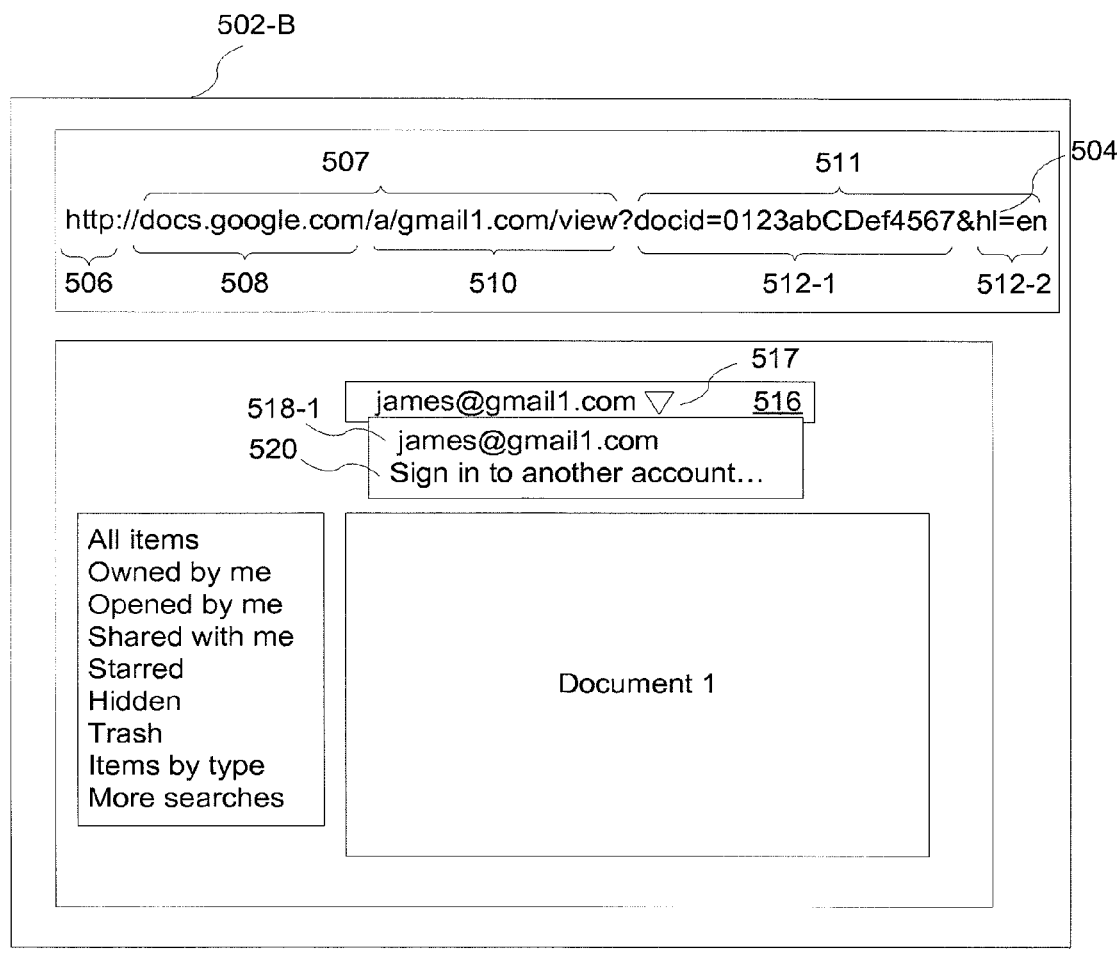

FIG. 5B illustrates an exemplary user interface displayed in response to a user's selection of the user selection icon 517. The user interface 502-B in FIG. 5B includes a display of the currently logged-in user name 518-1 (e.g., "james@gmaill.com"), and a menu option to sign in to another account 520.

Figure 5C:
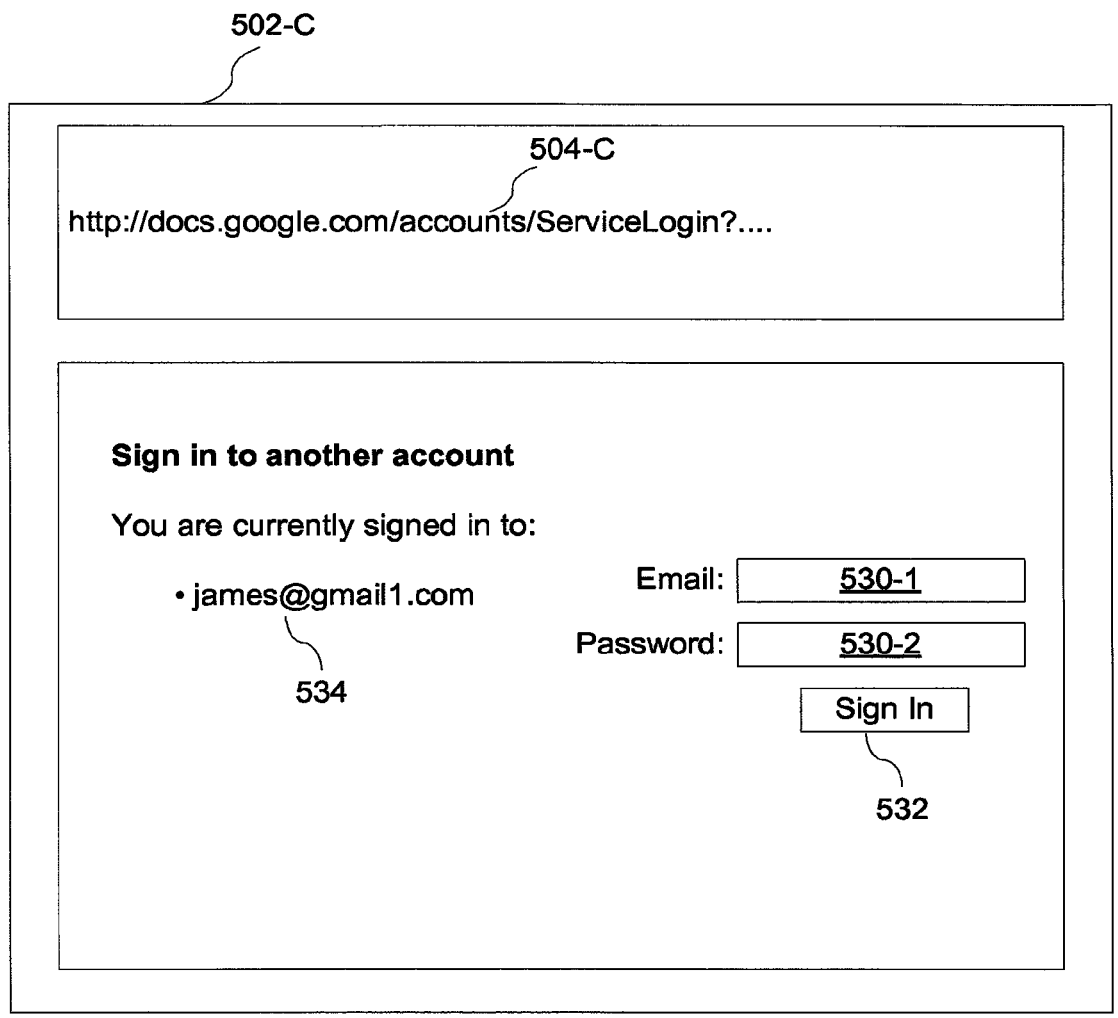

FIG. 5C illustrates an exemplary user interface 502-C displayed in response to a user's selection of the menu option to sign in to another account 520. In some embodiments, the user interface 502-B is displayed in a first tab (sometimes called a browser tab or application tab) of a web browser at the client 102. Selecting the menu option to sign in to another account 520 initiates opening a second tab in the web browser and displaying a login screen (e.g., the user interface 502-C) in the second tab, while maintaining the user interface 502-B in the first tab. This allows a user to see document information corresponding to a plurality of respective user names in a corresponding plurality of respective tabs. With document information for a plurality of distinct user names displayed in a plurality of concurrently active tabs, the user need only select different tabs to switch between the various sets of document information. Furthermore, it is noted that a user can open multiple tabs under a single user name so as to access more than one document, or more than one set of document information under the same user name, while keeping active one or more other tabs in which the user accesses document information under one or more other user names.

The user interface 502-C in FIG. 5C includes a URL 504-C corresponding to a user login screen, and a login screen where a user can provide an email address (e.g., 530-1) and a password (e.g., 530-2) for login. In some embodiments, the user interface 502-C also includes a list of user names (e.g., 534) currently logged-in from a respective client 102 (or from a respective web browser 314 in the respective client 102) to a corresponding server (e.g., document system 108). In some embodiments, the user interface 502-C also includes a user selectable icon (e.g., 532) to initiate sending the login information (e.g., the email address and the password) to the corresponding server.

Figure 5D:
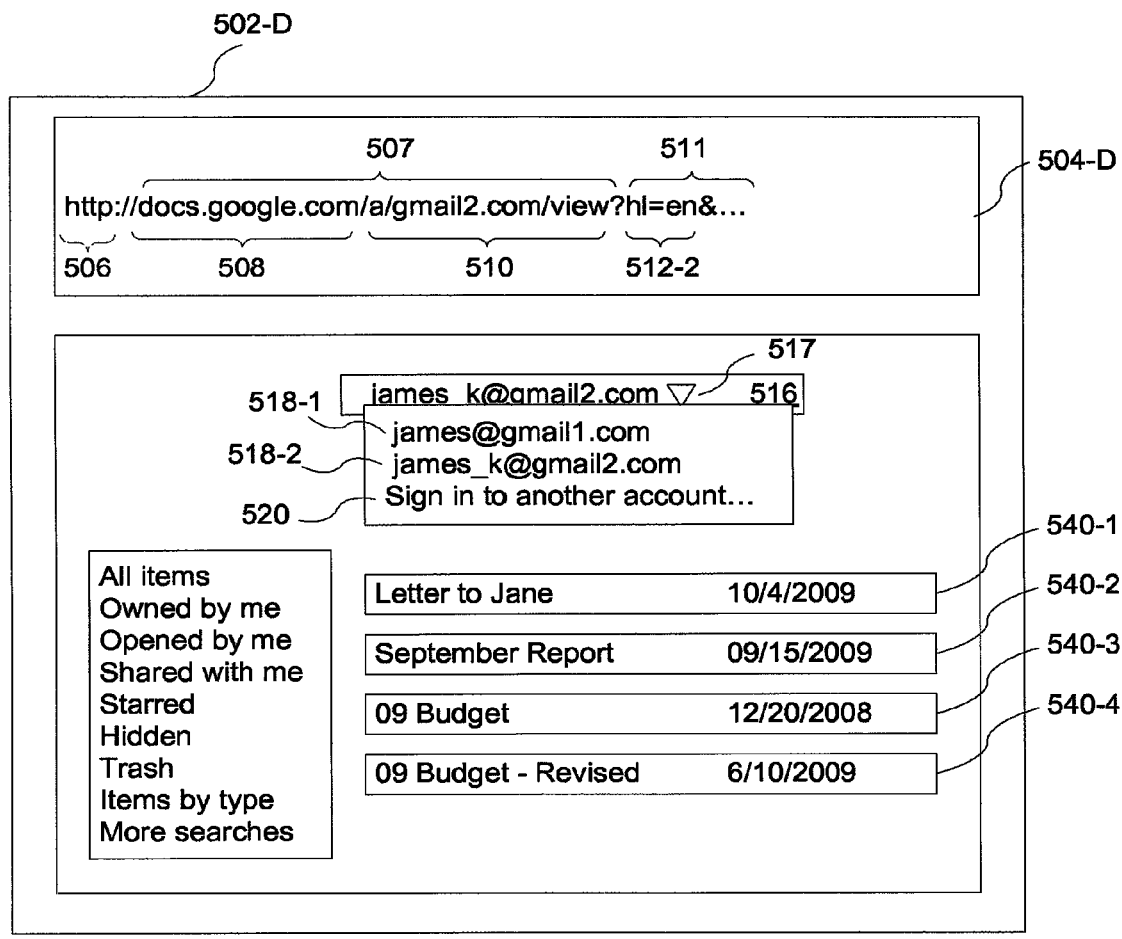

FIG. 5D illustrates an exemplary user interface displayed in response to a user's login using a different user name (e.g., "james_k@gmail2.com") and selecting a user selection icon 517. The user interface 502-D in FIG. 5D includes the user information 516, which indicates that the user is receiving document information corresponding to a user name "james_k@gmail2.com." In addition, the user interface 502-D includes a user selection menu, which includes user names already logged-in to the server (e.g., document system 108), such as "james@gmaill.com" and "james_k@gmail2.com," and a menu option to sign in to yet another account. Contrary to a traditional login process, which logs out a first logged-in user name "james@gmaill.com" when a second user name "james_k@gmail2.com" is used to log in to the same server (e.g., document system 108), this user interface maintains multiple user names logged-in to the same server (e.g., document system 108), and allows selection of a user name when accessing documents stored in the server (e.g., document system 108).

The user interface 502-D also includes a URL 504-D. The URL 504-D in FIG. 5D includes a scheme 506, domain name 508, path 510, and query string 511. The path 510 in FIG. 5D includes a user key, "gmail2.com," which corresponds to the domain name of the last logged-in user name (or the last used user name), "james_k@gmail2.com." As discussed above with reference to FIG. 5A, in some implementations the user key includes the full user name james_k@gmail2.com of the last used user name. In some embodiments, the user key is included in the query string 512 of the URL 504-D instead of the path 510. In some embodiments, the path and/or the query string is encrypted or includes encrypted information.

In FIG. 5D, it is noted that the query string 511 does not include the "docid" variable, and as a result, the user interface 502-D displays a set (or a list) of documents corresponding to the user name (e.g., "james_k@gmail2.com") instead of a particular document (e.g., a particular document corresponding to a docid). In some embodiments, in response to a request from a particular user name to access a specific document (specified by a docid), the server (e.g., document system 108) compares the user name with the specified document's access control list (ACL). If that comparison results in a determination that the user name does not have access rights to the document, the server modifies the URL 504-D in the request and does not provide the corresponding document to the user. For example, if the user name "james_k@gmail2.com" does not have access rights to a specified "document 1," the server (e.g., document system 108) provides a list of documents associated with the user name "james_k@gmail2.com" instead of providing the document 1. To do this, the server modifies the URL in the request to the URL for requesting a list of documents associated with (i.e., accessibly by) the user name.

In some embodiments, the list of documents includes document items 540 (e.g., 540-1 through 540-4, as shown in FIG. 5D), each of which can be selected to access a corresponding document. For example, selecting the document item 540-2 initiates accessing the September Report dated Sep. 15, 2009.

When the user has opened a second browser tab for a login using the second user name, the second tab is maintained after the login and used for displaying the document information corresponding to the second user name. For example, when the user interface 502-B is displayed in the first tab and the user interface 502-C is displayed in the second tab, after the login, the second tab is maintained after the login and the user interface 502-D is displayed in the second tab. The first and second tabs are concurrently active, enabling the user to access document information for either of the concurrently logged in user names simply by selecting the corresponding browser tab.

Figure 6A:
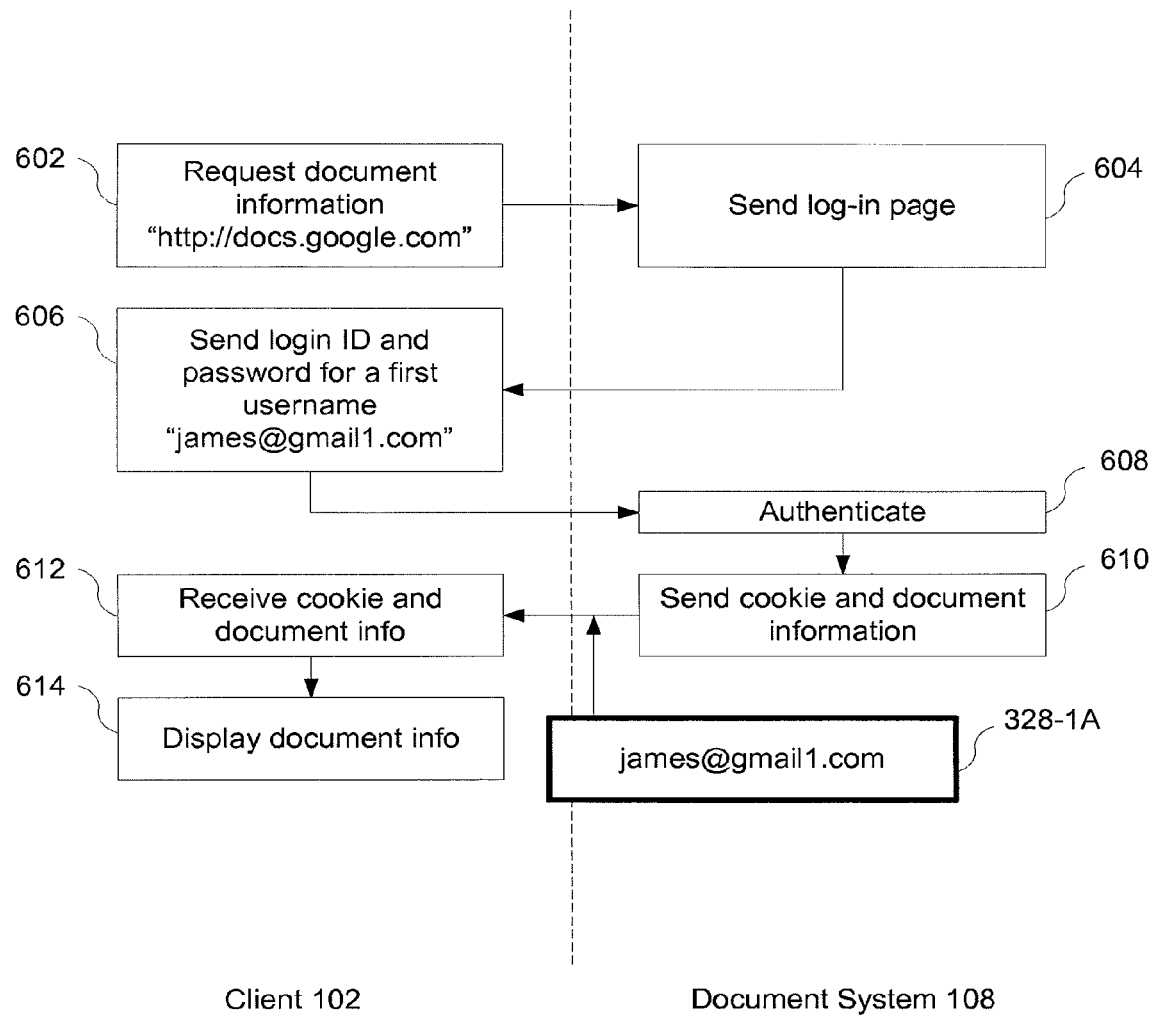
FIGS. 6A-6C are high-level flow diagrams illustrating processes performed by a client and a document system, in accordance with some embodiments.
Figure 6B:
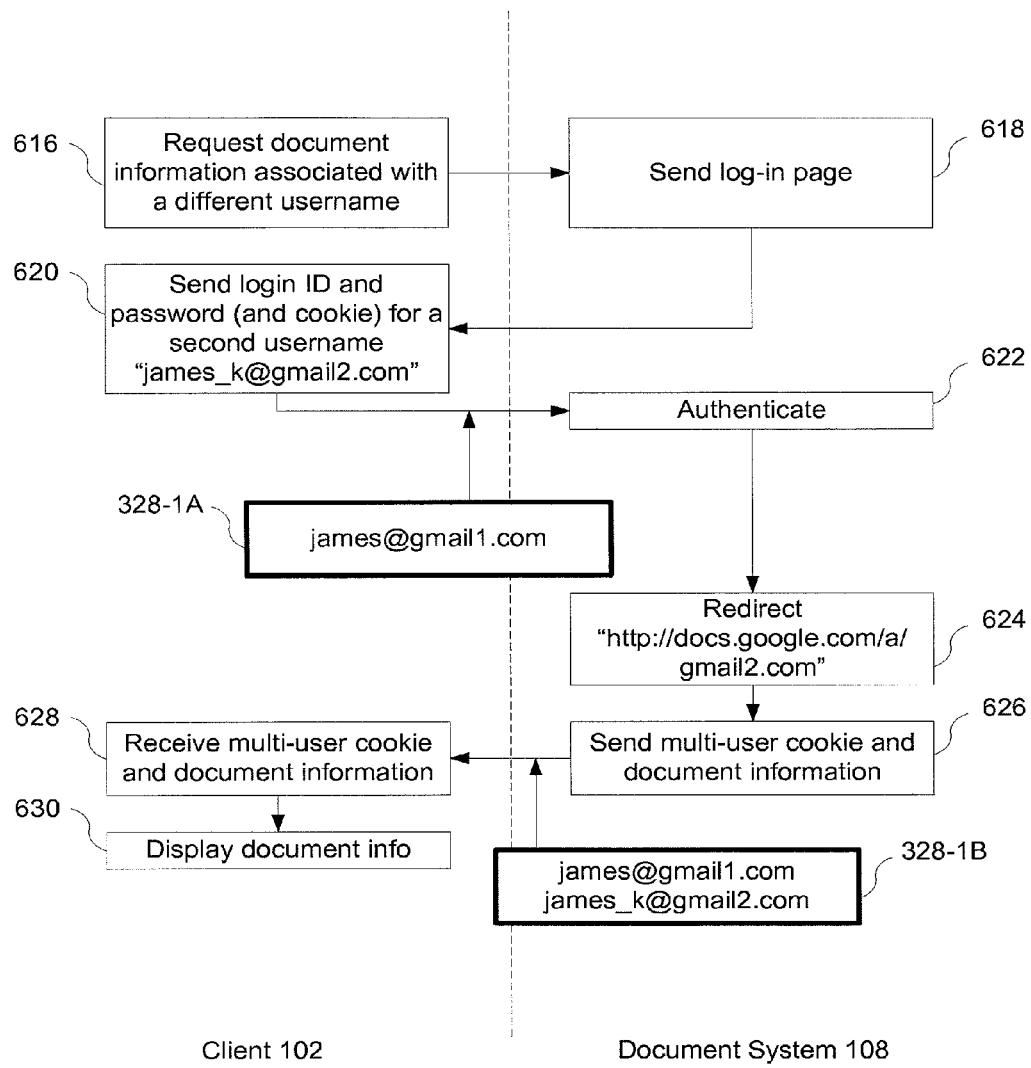
Figure 6C:
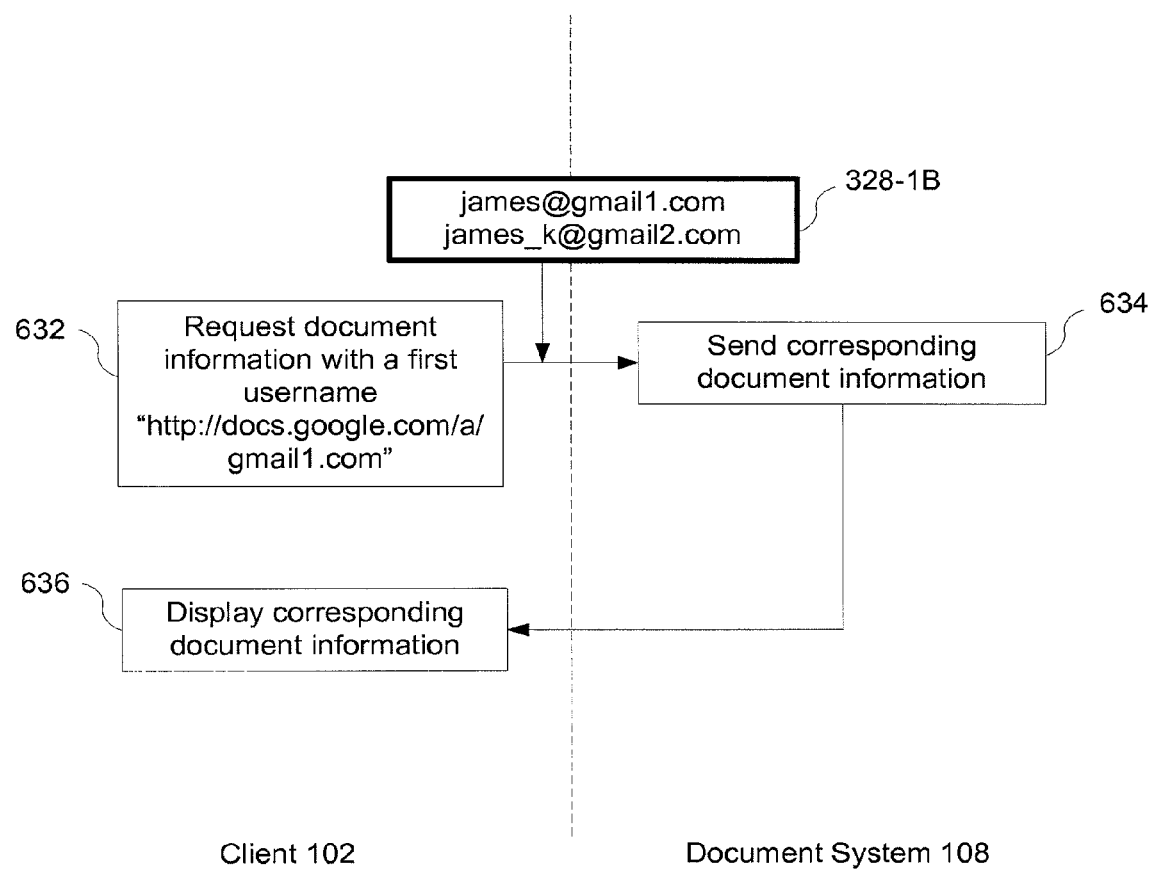

FIGS. 6A-6C are high-level flow diagrams illustrating processes performed by a client 102 and a document system 108, in accordance with some embodiments. It will be appreciated by those of ordinary skill in the art that one or more of the acts described may be performed by hardware, software, or a combination thereof, as may be embodied in one or more computing systems. In some embodiments, portions of the process performed by the document system 108 can be performed by client 102.

In FIG. 6A, client 102 requests (602) document information from the document system 108. In some embodiments, the request comprises an http request to a URL corresponding to the document system 108 (e.g., "http://docs.google.com").

The document system 108 receives the request. If the client 102 has not been authenticated by the document system 108 (e.g., the request did not include a valid cookie indicating that the user is authenticated for the document system 108), the document system 108 sends (604) a log-in page (e.g., a log-in page analogous to the user interface 502-C shown in FIG. 5C) to the client 102.

The client 102 receives the log-in page from the document system, and receives a login ID (e.g., an email address) and a password for a first user name from a user. The client 102 sends (606) the login ID (e.g., james@gmaill.com") and the password to the document system 108.

The document system 108 authenticates (608) the first user name based on the login ID and the password (e.g., by using the login processing module 124 in FIGS. 1 and 2). In some embodiments, the authenticating includes comparing the login ID and the password with information stored in the user information database 116.

In some embodiments, the document system 108 responds to the request (after a successful login, if needed) by redirects the request for document information by sending a redirect web page to the client 102, as described below with reference to the operation 624 and operation 714.

The document system 108 sends (610) a cookie and the requested document information to the client 102. In this example, the document information includes a list of documents associated with the first user name. The cookie 328-1A sent to the client includes information about the first user name (e.g., "james@gmaill.com"), provided by the client 102 during the login process 604-606-608.

The client 102 receives (612) the cookie and the document information, and displays (614) the document information in a GUI 111. The received cookie is typically stored in a cookie cache 324 (FIG. 3) at the client 102, and typically a cookie tree or cookie directory is updated to reflect the addition of the received cookie to the cookie cache.

In FIG. 6B, when the client 102 requests (616) document information associated with another login ID (e.g., a different user name than the last user name used to access document information), the document system 108 sends (618) a log-in page (e.g., the user interface 502-C shown in FIG. 5C) to the client 102. In some embodiments, the client 102 sends a cookie (e.g., cookie 328-1A) with the request, thereby informing the document system 108 of the user names currently logged in from the client 102. As explained elsewhere in this document, the user names identified in the cookie are typically user names logged into the document system from a single browser application at the client 102. Optionally, the document system 108 verifies the user name information in the cookie, and if the username under which the request was submitted is not currently logged in, the log-in page is sent by the document system 108 to the client 102.

The client 102 receives the login-in page, and sends (620) the login ID and a password for a second user name (e.g., "james_k@gmail2.com") along with the cookie (e.g., cookie 328-1 A) to the document system 108. The document system 108 authenticates (622) the second user name, and redirects (624) the request for document information. The redirecting includes modifying the URL in the received request to indicate an active (or selected) user name, which is associated with the document information to be provided. For example, the URL is changed to "http://docs.google.com/a/gmail2.com," where the path "/a/gmail2.com" is used to identify a corresponding user name (e.g., a user name in the domain "gmail2.com"). The redirecting operation is described in further detail below with reference to operation 714 in FIG. 7A.

The document system 108 sends (626) a multi-user cookie and the requested document information to the client. For example, the document information includes a list of documents associated with the second user name. The multi-user cookie includes information about the first user name and the second user name. In effect, the document system 108 adds the second user name to cookie 328-1A to produce cookie 328-1B.

The client 102 receives (628) the multi-user cookie 328-1 B and the document information, and displays (630) the document information in the GUI 111. The client also stores the multi-user cookie 328-1B in its cookie cache, thereby making the multi-user cookie available to be returned to the document system 108 when the client next sends a request to the document system 108.

In FIG. 6C, the client 102 requests (632) document information associated with another logged-in login ID (e.g., the first user name). The client 102 also sends the multi-user cookies (e.g., cookie 328-1 B). The request includes a user key (e.g., "/a/gmaill.com"), which is used to identify a corresponding user name (e.g., a user name in the domain "gmaill.com"). Out of the user names in cookie 328-1B, "james@gmaill.com" is selected as the corresponding user name, because the domain name of "james@gmaill.com" matches the user key. In response to the request, the document system 108 sends (634) document information corresponding to the selected user name (e.g., "james@gmaill.com"). In some embodiments, the document system 108 also sends the multi-user cookie (e.g., cookie 328-1 B). Optionally, the multi-user cookie returned to the client includes updated information (e.g., an updated last activity time) compared with the multi-user cookie sent by the client 102 with the request. The client 102 receives the document information, and displays (636) the document information in the GUI 111.

Figure 7A:
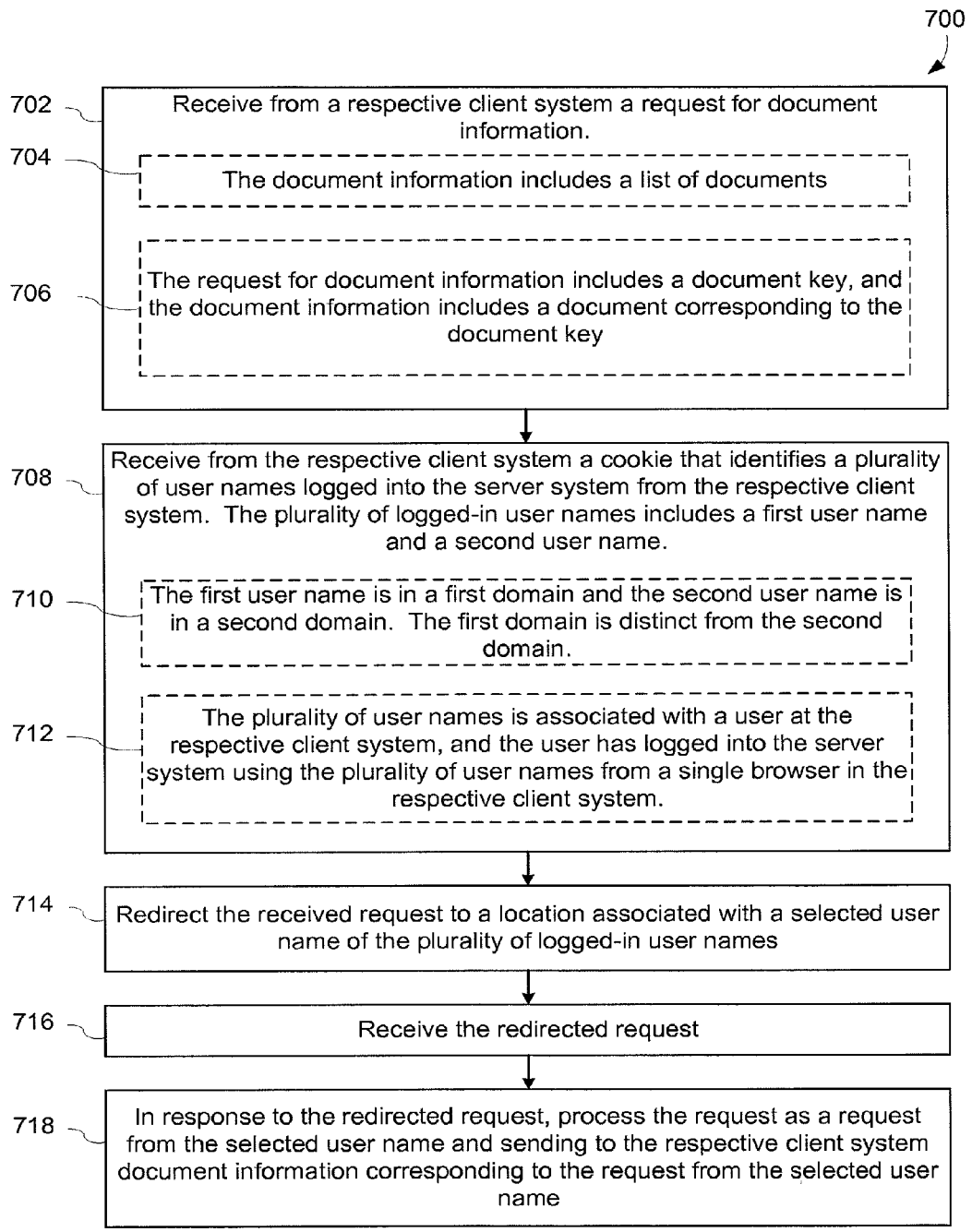
FIGS. 7A and 7B are flowcharts representing a method of managing multiple logins to a server, in accordance with some embodiments.
Figure 7B:
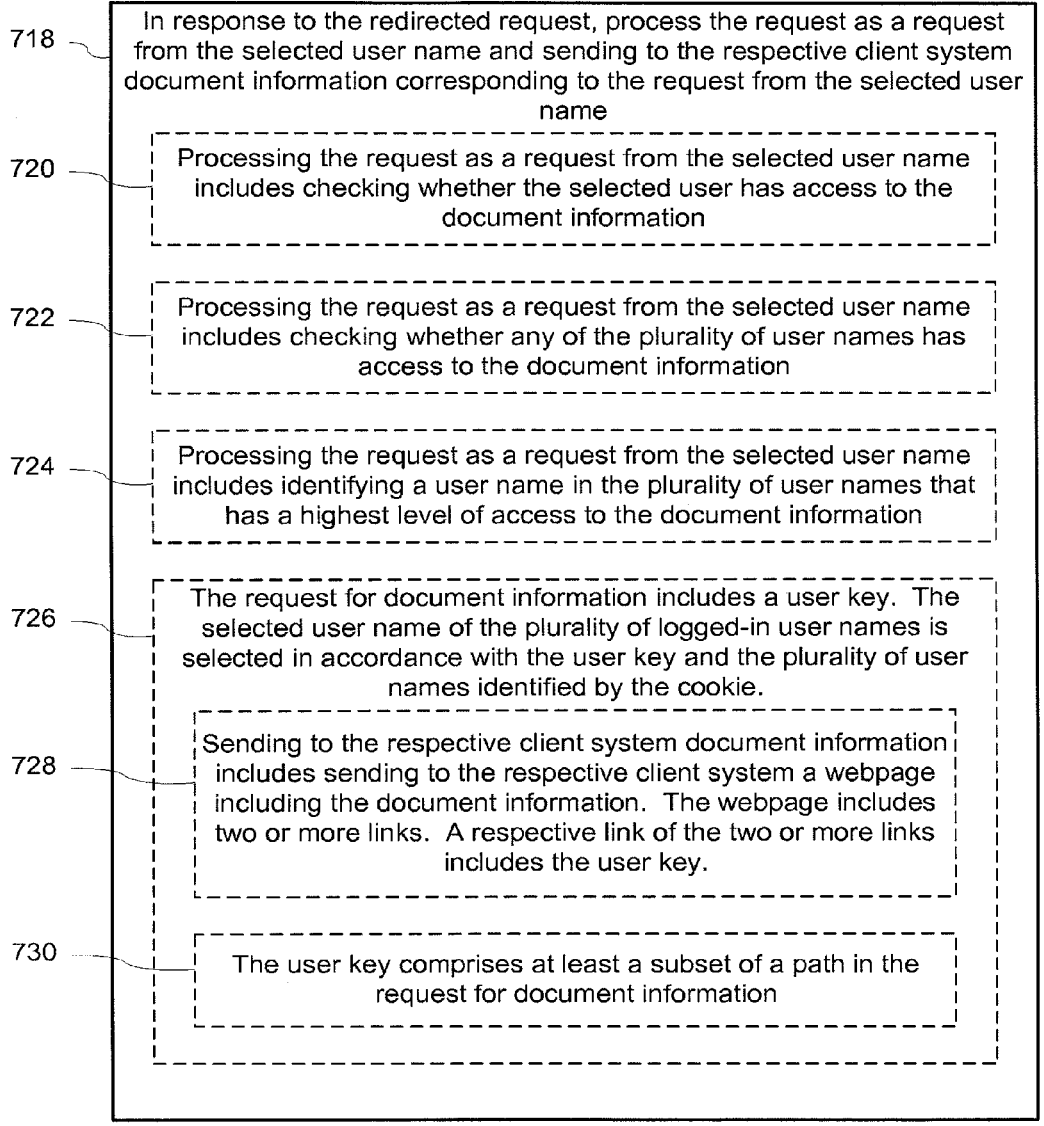

FIGS. 7A and 7B are flowcharts representing a method 700 of managing multiple logins to a server, in accordance with some embodiments. The method is performed at a server system having one or more processors and memory storing one or more programs executed by the one or more processors (e.g., document system 108).

The server system receives (702) from a respective client system a request for document information. For example, the request can be an http request for document information from the document system 108 (e.g., "http://docs.google.com").

In one example, the requested document information includes (704) a list of documents accessible by the requester (e.g., a particular user name). In this example, the request includes a path or a query string to indicate that the request is for a list of documents.

In another example, the request for document information includes (706) a document key, and the document information includes a document corresponding to the document key. In one implementation of this example embodiments, the request includes a document key (e.g., "0123456") in the query string (e.g., "?docid=0123456") of a URL (e.g., "http://docs.google.com/?docid=0123456"). In other implementations, the request includes the document key in the path of the request URL (i.e., the URL included in an HTTP request sent to the document system). Alternatively, the document key is included in the received cookie. In some embodiments, when the request URL does not include a path or a query string to indicate that the request is for a particular document (e.g., the request does not include a document key), the request is deemed to be a request for a list of documents, and a list of documents is provided in response to the request.

In some implementations, the document key included in a request for a specific document is user-specific. In some implementations, however, some document keys are open-invitation keys allowing anyone access (i.e., such document keys are non-user-specific).

The server system receives (708) from the respective client system a cookie that identifies a plurality of user names logged into the server system from the respective client system. In one example, the plurality of logged-in user names including a first user name and a second user name distinct from the first user name (e.g., the cookie 328-I B in FIG. 6C, which includes the first user name "james@gmaill.com" and the second user name "james_k@gmail2.com").

In the above example, the first user name in the received cookie is (710) in a first domain and the second user name in the received cookie is in a second domain. The first domain is distinct from the second domain. For example, the first user name "james@gmaill.com" is in the first domain, "gmaill.com" and the second user name "james_k@gmail2.com" is in the second domain, "gmail2.com." The first domain, "gmaill.com" is distinct from the second domain, "gmail2.com."

In most, but not necessarily all, situations, including the current example, all the user names in the received cookie are associated (712) with the same user at the respective client system; the user has logged into the server system using the plurality of user names from a single browser in the respective client system. For example, the same user can log in to the server system (e.g., document system 108) using the plurality of user names (e.g., "james@gmaill.com" and "james_k@gmail2.com") from the single browser in the client 102. A traditional cookie in the single browser contains only a single user name (e.g., either "james@gmaill.com" or james_k@gmail2.com, but not both).

The embodiments described here work equally well when two (or more) distinct users having two or more distinct user names are logged into the document server from the same browser at the client 102, so long as the users trust each other with respect to their documents at the document server. In the embodiments described here, documents associated with all of the user names that are currently logged in and identified within the cookie are accessible to the current user of the browser at the client. In some alternative embodiments, a password is required when the user switches between user names so as to access different sets of documents, but that substantially reduces ease of access to the user's documents. In yet another alternative embodiment, the user profile information retained by the document system, or an associated system, includes a list of all the user names known by the document system (or the associated system) to be associated with the same user, and the document system allows multiple logins by the user only for those user names.

The server system redirects (714) the received request to a location associated with a selected user name of the plurality of logged-in user names. In some embodiments, the redirecting includes modifying the request (e.g., the URL) in accordance with the selected user name. For example, if the selected user name is "james@gmaill.com," the URL in the request (e.g., "http://docs.google.com") is modified to "http://docs.google.com/gmaill.com," "http://docs.google.com/a/gmail1.com," "http://docs.google.com/a/james@gmaill.com," or "http://docs.google.com/a/james_at_gmaill.com". The URL in the request is modified in an analogous manner if the selected user name is "james@gmail2.com."

In some embodiments, the redirecting includes providing a webpage including an html redirect code and the modified URL to the client 102. For example, the redirect code includes a redirect status code, such as 302, which indicates a temporary redirect, or any other suitable status code. Upon receiving the webpage with the html redirect code and modified URL, the browser application at client 102 automatically sends a new http request to the server system (e.g., document server 108) using the modified URL, thereby restarting the process of handling an incoming request at the document system. Alternatively, the server system may provide a redirected webpage directly (e.g., using server scripting), without sending to the client a web page with an http redirect code.

The server system receives (716) the redirected request (e.g., the modified URL). The server system, in response to the redirected request, processes (718) the request as a request from the selected user name and sends to the respective client system document information corresponding to the request from the selected user name. For example, if the selected user name is "james@gmaill.com," document server 108 sends document information (e.g., a list of document) corresponding to the user name "james@gmaill.com."

In some embodiments, processing the request as a request from the selected user name includes (720) checking whether the selected user has access to the document information. In some embodiments, the checking includes comparing the user name with an access control list for the document information (e.g., authorized user names for a corresponding document or a set of documents (e.g., a list of documents)). Optionally, the checking includes retrieving an access control list for the document information (e.g., from document database 120). Optionally, the checking is performed at a server within the server system that performs ACL-related services.

Alternatively, processing the request as a request from the selected user name includes (722) checking whether any of the plurality of user names identified in the received cookie has access to the document information. For example, when the user is logged in using the first and second user names: "james@gmaill.com" and "james_k@gmail2.com," the document system 108 checks whether either "james@gmaill.com" or "james_k@gmail2.com" has access to the document information. In other words, even if the selected user name (e.g., "james@gmaill.com") does not have access to the document information, the document system 108 provides the document information if any other user name in the plurality of user names (e.g., "james_k@gmail2.com") in the received cookie has access to the document information.

In some embodiments, processing the request as a request from the selected user name includes (724) identifying a user name in the plurality of user names (in the received cookie) that has a highest level of access to the document information. For example, when the user is logged in using both the first and second user names: "james@gmaill.com" and "james_k@gmail2.com," the document system 108 checks whether either "james@gmaill.com" or "james_k@gmail2.com" has a highest level of access to the document information. If the first user name has a read-only access, and the second user name has a read-write access, the document system 108 provides the document information with the read-write access, regardless of whether the selected user name is the first user name or the second user name.

In some embodiments, the request for document information includes (726) a user key, and the selected user name of the plurality of logged-in user names is selected in accordance with the user key and the plurality of user names identified by the cookie. For example, the user key can be the full user name (e.g., "james@gmaill.com"), a portion of the user name (e.g., the domain "gmaill.com", "gmaill", or "1"), a sequential value corresponding to the user name, or any other key that uniquely identifies or is uniquely associated with the user name (e.g., a hash key produced by applying a hash function to the user name or a corresponding value). In some embodiments, the user key is encrypted.

In some embodiments, the user key comprises (730) at least a subset of a path in the request for document information. For example, the user key ("gmaill.com") is part of the path in the request URL (e.g., "http://docs.google.com/a/gmaill.com"). In some embodiments, the user key comprises at least a subset of a query string in the request for document information (e.g., "http://docs.google.com/?userid=gmaill.com").

In some embodiments, sending to the respective client system document information includes (728) sending to the respective client system a webpage including the document information. The webpage includes two or more links, and a respective link of the two or more links includes the user key. For example, the user interface 502-D in FIG. 5D includes a list of documents, and the list of documents includes document items 540. Each document item 540 includes a link (not shown in FIG. 5D) to the corresponding document in the document database 120. Each link includes the user key (e.g., the first link is directed to "http://docs.google.com/a/gmaill.com/?docid=123456789" and the second link is directed to "http://docs.google.com/a/gmaill.com/?docid=ABCDEFGHI"). This allows the document system 108 to identify the selected user name when a linked document is selected.

In another example, the document information sent to the respective client system includes a webpage that has a first link and a second link, each of which includes the same document key but a different user key. In this example, the first link includes a first user key, and the second link includes a second user key. For example, the web page may have a first link labeled as "view the document as james@gmaill.com" and a second link labeled as "view the document as james_k@gmail2.com". The first link is directed to "http://docs.google.com/a/gmaill.com?docid=0123456," and the second link is directed to "http://docs.google.com/a/gmail2.com?docid=0123456." More generally, the document information sent to a respective client may include multiple links to one or more documents, and those links may include either the same user key or different user keys, depending on the implementation and also depending on the specific request sent to the server system.

Note that details of the processes described above with respect to method 700 are also applicable in an analogous manner to methods described below, including method 800. For brevity, these details are not repeated below.

Figure 8A:
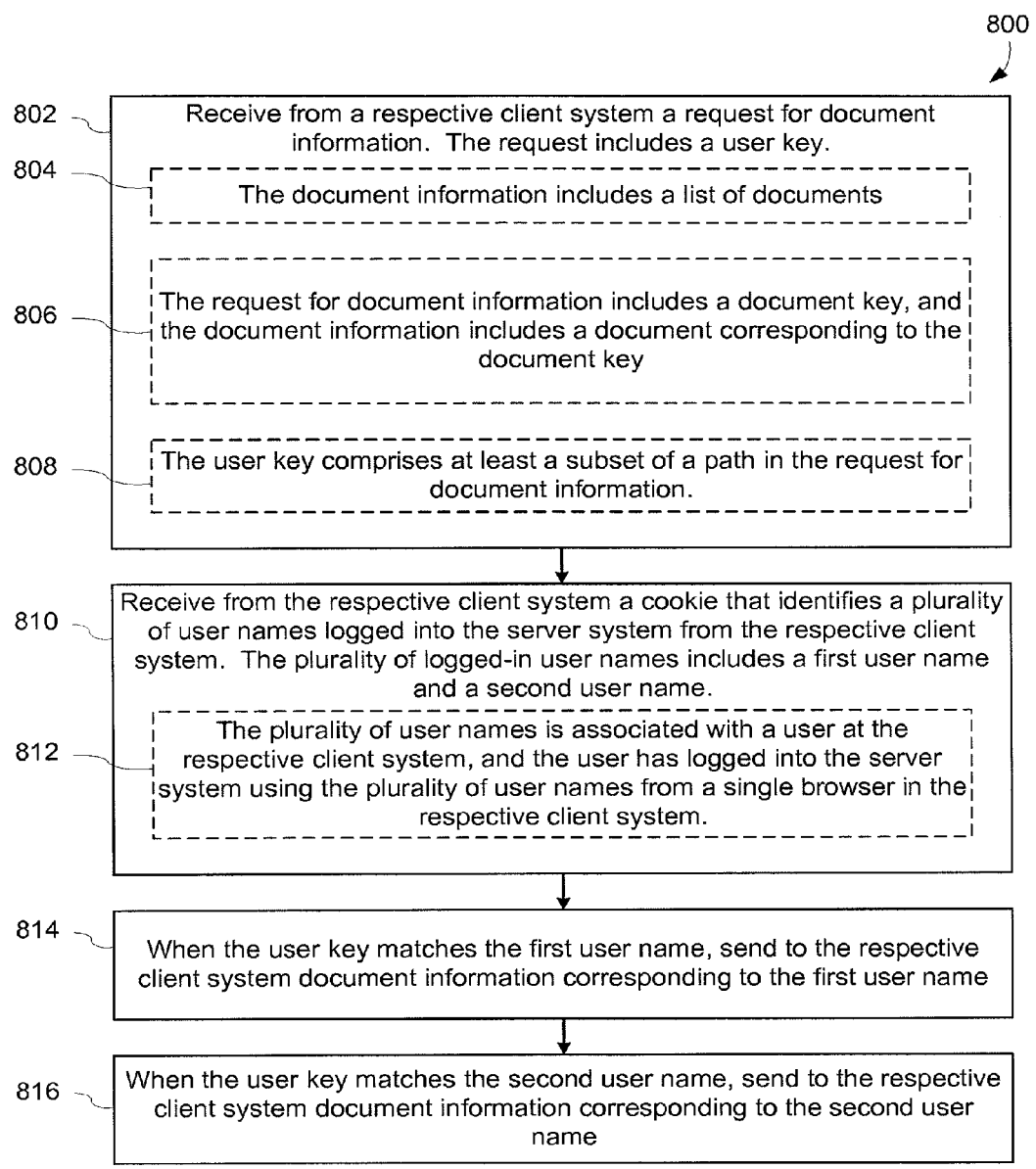
FIGS. 8A and 8B are flowcharts representing a method of managing multiple logins to a server, in accordance with some embodiments.
Figure 8B:
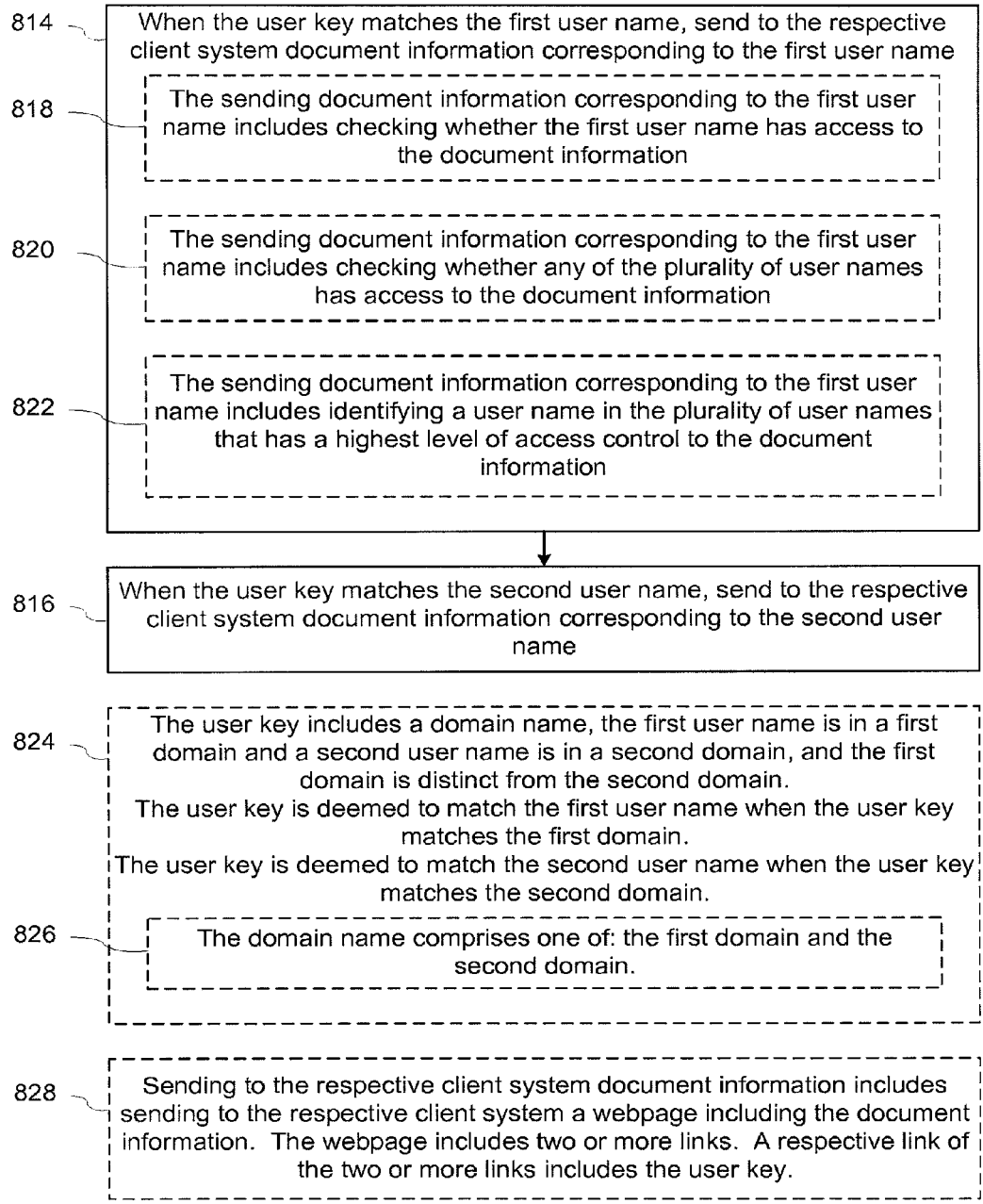

FIGS. 8A and 8B are flowcharts representing a method of managing multiple logins to a server, in accordance with some embodiments. The method is performed at a server system having one or more processors and memory storing one or more programs executed by the one or more processors (e.g., document system 108).

The server system receives (802) from a respective client system a request for document information, the request including a user key (e.g., see the description of operation 702).

In one example, the requested document information includes (804) a list of documents accessible by the requester (e.g., see the description of operation 704).

In another example, the request for document information includes (806) a document key, and the requested document information includes a document corresponding to the document key (e.g., see the description of operation 706).

In some embodiments, the user key comprises (808) at least a subset of a path in the request for document information (e.g., see the description of operation 730).

The server system receives (810) from the respective client system a cookie that identifies a plurality of user names logged into the server system from the respective client system. In one example, the plurality of logged-in user names includes a first user name and a second user name (e.g., see the description of operation 708).

In some embodiments, the plurality of user names is (812) associated with a user at the respective client system, and the user has logged into the server system using the plurality of user names from a single browser in the respective client system (e.g., see the description of operation 712).

When the user key matches the first user name, the server system sends (814) to the respective client system document information corresponding to the first user name. In other words, the request is processed as a request from the first user name. For example, if the user key (e.g., "gmaill.com") matches a user name in the cookie (e.g., "james@gmaill.com"), the document system 108 sends document information corresponding to the matching user name (e.g., "james@gmaill.com"). In some embodiments, the user key is deemed to match the first user name when the user key matches at least a portion of the first user name (e.g., "gmaill.com" matches a portion of the "james@gmaill.com").

In some embodiments, processing the request as a request from a selected user name (of the plurality of user names in the received cookie) includes (818) checking whether the selected user has access to the document information (e.g., see the description of operation 720).

Alternatively, or in addition, processing the request as a request from the selected user name includes (820) checking whether any of the plurality of user names identified in the received cookie has access to the document information (e.g., see the description of operation 722).

In some embodiments, processing the request as a request from the selected user name includes (822) identifying a user name in the plurality of user names (in the received cookie) that has a highest level of access control to the document information (e.g., see the description of operation 724).

In some embodiments, when the user key matches two or more user names in the plurality of user names, the server system sends document information corresponding to a first logged-in user name in the matching user names. Alternatively, when the user key matches two or more user names in the plurality of user names, the server system sends document information corresponding to a last used user name in the matching user names. In yet other embodiments, when the user key matches two or more user names in the plurality of user names, the server system sends document information corresponding to any of the matching user names (e.g., if the user key matches the first and second user names, the server system sends document information corresponding to the first user name and document information corresponding to the second user name).

When the user key matches the second user name in the received cookie, the server system sends (816) to the respective client system document information corresponding to the second user name (e.g., see the description of operation 724).

In some embodiments, the user key includes (824) a domain name. In one example, the first user name in the received cookie is in a first domain and a second user name in the received cookie is in a second domain (e.g., the first user name "james@gmaill.com" is in the domain "gmaill.com" and the second user name "james_k@gmail2.com" is in the domain "gmail2.com"). The first domain is distinct from the second domain. The user key is deemed to match the first user name when the user key matches the first domain (e.g., if the user key is "gmaill.com", the user key is deemed to match the first user name "james@gmaill.com"). The user key is deemed to match the second user name when the user key matches the second domain (e.g., if the user key is "gmail2.com", the user key is deemed to match the first user name "james@gmail2.com").

In the above example, the domain name in the user key comprises (826) one of: the first domain and the second domain. More specifically, in the above example the domain name in the user key is either "gmaill.com" or "gmail2.com."

In some embodiments, sending to the respective client system document information includes (828) sending to the respective client system a webpage including the document information. Typically, when the document information is a list of documents accessible by a respective user name corresponding to the user key, the webpage includes two or more links, and a respective link of the two or more links includes the user key (e.g., see the description of operation 728).

In some embodiments, the server system receives a logout request from the respective client system. In some embodiments, in response to the logout request, the server system logs out the selected user name from the server system. The server system removes the selected user name from the cookie. The remainder of the plurality of user names remain logged in to the server system. In some embodiments, in response to the logout request, the server system logs out the plurality of user names (i.e., all of the user names identified in the received cookie) from the server system.

As illustrated with reference to FIG. 6B, a computer-implemented method for adding a user name to a cookie is described, in accordance with some embodiments. The computer implemented method is performed at a server system having one or more processors and memory storing one or more programs executed by the one or more processors (e.g., document system 108).

The server system receives from a respective client system a first cookie including at least a first user name logged into the server system from the respective client system. For example, in FIG. 68, the document system 108 receives a cookie including the first user name, "james@gmaill.com" in response to operation 620. In some embodiments, the cookie includes information to identify the first user name (e.g., a hash key assigned to the first user name) instead of including the first user name directly.

The server system receives from the respective client system login information for a second user name. For example, in FIG. 6B, the document system 108 receives the login ID and the password for a second user name, "james_k@gmail2.com" in response to operation 620.

The server system authenticates the login information for the second user name (e.g., see the description of operation 608).

When the login information for the second user name is authenticated, the server system generates a second cookie such that the second cookie includes at least the first user name and the second user name (e.g., the second cookie 328-1 B includes the first user name "james@gmaill.com" and the second user name "james_k@gmail2.com."

The server system sends the second cookie to the respective client system (e.g., see the description of operation 626). In a typical implementation, the second cookie replaces the first cookie in a cookie cache at the respective client system.

Turning to the user interface (UI), a method of providing a UI to manage multiple logins to a server system is described in accordance with some embodiments. The method is performed at a server system having one or more processors and memory storing one or more programs executed by the one or more processors (e.g., document system 108).

The server system provides to a respective client system a web page for accessing document information from the server system (e.g., a web page displayed as an user interface 502-D in FIG. 5D). The web page includes a user selectable object (e.g., user selection icon 517) for selecting a user name from a plurality of user names logged into the server system from the respective client system.

The server system receives a request for document information corresponding to a selected user name of the plurality of user names. For example, if the user selects a first user name "james@gmaill.com," the server system receives an http request "http://docs.google.com/a/gmaill.com."

The server system, in response to receiving the request, sends to the respective client system document information corresponding to the request.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed:

1. A computer implemented method, comprising:
   at a server system having one or more processors and memory storing one or more programs executed by the one or more processors,
   receiving, from a client browser, a request for access controlled information associated with the server system;
   receiving, from the client browser, a single cookie that identifies a plurality of user names currently logged into the server system via the client browser from a single web page or application, the plurality of currently logged-in user names including a first user name and a second user name distinct from the first user name;
   determining, from among the plurality of currently logged-in user names, a requesting user name associated with the request for access controlled information;
   processing the request; and
   sending, to the client browser, access controlled information corresponding to the request from the requesting user name.

2. The method of claim 1, wherein processing the request as a request from the selected user name includes checking whether the selected user has access to the access controlled information.

3. The method of claim 1, wherein processing the request as a request from the selected user name includes checking whether any of the plurality of user names has access to the access controlled information.

4. The method of claim 1, wherein processing the request as a request from the selected user name includes identifying a user name in the plurality of user names that has a highest level of access to the access controlled information.

5. The method of claim 1, wherein the first user name is in a first domain and the second user name is in a second domain, and the first domain is distinct from the second domain.

6. The method of claim 1, wherein the request for access controlled information includes a user key; and the selected user name of the plurality of currently logged-in user names is selected in accordance with the user key and the plurality of user names identified by the cookie.

7. The method of claim 1, wherein the access controlled information includes a list of access controlled resources.

8. The method of claim 1, wherein the request for access controlled information includes a resource key, and the access controlled information includes a resource corresponding to the resource key.

9. A computer implemented method, comprising:
at a server system having one or more processors and memory storing one or more programs executed by the one or more processors,
receiving from a client browser a request for access controlled information associated with the server system, the request including a user key; and
receiving from the client browser a single cookie that identifies a plurality of user names currently logged into the server system via the client browser from a single web page or application, the plurality of currently logged-in user names including a first user name and a second user name distinct from the first user name;
when the user key matches the first user name, sending to the client browser access controlled information corresponding to the first user name; and
when the user key matches the second user name, sending to the client browser access controlled information corresponding to the second user name.

10. The method of claim 9, wherein sending access controlled information corresponding to the first user name includes checking whether the first user name has access to the access controlled information.

11. The method of claim 9, wherein sending access controlled information corresponding to the first user name includes checking whether any of the plurality of user names has access to the access controlled information.

12. The method of claim 9, wherein sending access controlled information corresponding to the first user name includes identifying a user name in the plurality of user names that has a highest level of access control to the access controlled information.

13. The method of claim 9, wherein
the user key includes a domain name, the first user name is in a first domain and a second user name is in a second domain, and the first domain is distinct from the second domain;
the user key is deemed to match the first user name when the user key matches the first domain; and
the user key is deemed to match the second user name when the user key matches the second domain.

14. The method of claim 13, wherein the domain name comprises one of: the first domain and the second domain.

15. The method of claim 9, wherein the access controlled information includes a list of access controlled resources.

16. The method of claim 9, wherein the request for access controlled information includes a resource key, and the access controlled information includes a resource corresponding to the resource key.

17. The method of claim 9, wherein sending to the respective client browser access controlled information includes sending to the client browser a webpage including the access controlled information; the webpage includes two or more links; and a respective link of the two or more links includes the user key.

18. The method of claim 9, wherein the user key comprises at least a subset of a path in the request for access controlled information.

19. A server system, comprising:
one or more processors;
memory storing one or more programs for execution by the one or more processors, the one or more programs including instructions for:
receiving from a client browser a request for access controlled information associated with the server system;
receiving from the client browser a single cookie that identifies a plurality of user names currently logged into the server system via the client browser from a single web page or application, the plurality of currently logged-in user names including a first user name and a second user name distinct from the first user name;
redirecting the received request to a location associated with a selected user name from among the plurality of logged-in user names;
receiving the redirected request; and
in response to the redirected request, processing the request as a request from the selected user name and sending to the client browser access controlled information corresponding to the request from the selected user name.

20. A computer readable storage medium storing one or more programs for execution by one or more processors in a server system, the one or more programs including instructions for:
receiving from a client browser a request for access controlled information associated with the server system;
receiving from the client browser a single cookie that identifies a plurality of user names currently logged into the server system via the respective client browser from a single web page or application, the plurality of currently logged-in user names including a first user name and a second user name distinct from the first user name;
redirecting the received request to a location associated with a selected user name from among the plurality of currently logged-in user names;
receiving the redirected request; and
in response to the redirected request, processing the request as a request from the selected user name and sending to the client browser access controlled information corresponding to the request from the selected user name.

21. A server system, comprising:
one or more processors;
memory storing one or more programs for execution by the one or more processors, the one or more programs including instructions for:
receiving from a client browser a request for access controlled information associated with the server system, the request including a user key; and
receiving from the client browser a single cookie that identifies a plurality of user names currently logged into the server system via the client browser from a single web page or application, the plurality of currently logged-in user names including a first user name and a second user name distinct from the first user name;
when the user key matches the first user name, sending to the client browser access controlled information corresponding to the first user name; and
when the user key matches the second user name, sending to the client browser access controlled information corresponding to the second user name.

* * * * *